US012434237B2

(12) United States Patent
Gao et al.

(10) Patent No.: US 12,434,237 B2
(45) Date of Patent: Oct. 7, 2025

(54) TEMPERATURE CONTROL SYSTEM, DETECTION SYSTEM AND TEMPERATURE CONTROL METHOD FOR MICRO-FLUIDIC CHIP

(71) Applicants: Beijing BOE Sensor Technology Co., Ltd., Beijing (CN); BOE TECHNOLOGY GROUP CO., LTD., Beijing (CN)

(72) Inventors: Yongjia Gao, Beijing (CN); Yingying Zhao, Beijing (CN); Hui Liao, Beijing (CN); Wenliang Yao, Beijing (CN); Le Gu, Beijing (CN); Bolin Fan, Beijing (CN); Yue Li, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 1025 days.

(21) Appl. No.: 17/600,090

(22) PCT Filed: Feb. 26, 2021

(86) PCT No.: PCT/CN2021/078127
§ 371 (c)(1),
(2) Date: Sep. 29, 2021

(87) PCT Pub. No.: WO2021/175163
PCT Pub. Date: Sep. 10, 2021

(65) Prior Publication Data

US 2022/0193669 A1 Jun. 23, 2022

(30) Foreign Application Priority Data

Mar. 2, 2020 (CN) ......................... 202010136822.8

(51) Int. Cl.
*B01L 3/00* (2006.01)
*G05D 23/19* (2006.01)
*G05D 23/24* (2006.01)

(52) U.S. Cl.
CPC .... *B01L 3/502715* (2013.01); *G05D 23/1928* (2013.01); *G05D 23/24* (2013.01);
(Continued)

(58) Field of Classification Search
CPC ......... B01L 3/502715; B01L 2200/147; B01L 2300/0645; B01L 2300/0819;
(Continued)

(56) References Cited

U.S. PATENT DOCUMENTS

| | | | | |
|---|---|---|---|---|
| 8,380,457 | B2 | 2/2013 | Coursey | |
| 2011/0056926 | A1* | 3/2011 | Coursey | B01L 7/525 702/65 |
| 2015/0182966 | A1 | 7/2015 | Coursey et al. | |

FOREIGN PATENT DOCUMENTS

| | | | |
|---|---|---|---|
| CN | 201097243 | Y | 8/2008 |
| CN | 101389200 | A | 3/2009 |

(Continued)

OTHER PUBLICATIONS

China Patent Office, CN202010136822.8 First Office Action issued on May 6, 2021.
China Patent Office, CN202010136822.8 Second Office Action issued on Nov. 16, 2021.
Yu, et al., "Sensor principle and detection technology" issued on Feb. 28, 2017, p. 123 of.
Yang, et al., "Computer Control Systems—Theory, Technology and Applications ", issued on May 31, 2006, pp. 358-359.

*Primary Examiner* — Jill A Warden
*Assistant Examiner* — Alex Ramirez
(74) *Attorney, Agent, or Firm* — HOUTTEMAN LAW LLC

(57) ABSTRACT

Provided are a temperature control system, a detection system and a temperature control method for a micro-fluidic chip. The temperature control system includes a circuit structure in a functional layer of the micro-fluidic chip, corresponding to a reaction zone of the micro-fluidic chip, and including at least two thermistors and an input port and an output port, wherein the input port and the output port are electrically coupled through the thermistors to form an
(Continued)

401
2
3
1
R1
R2
R3
R4
R5
N1
1
3
2
100
Circuit Structure
101
Heating Device
102
Temperature Sensor
200
Main Control Unit
300
Cooling Device application circuit; and a controller electrically coupled to each port and configured to select a first input port and a first output port, such that the circuit structure is configured to form a first application circuit as a heating device, and to select a second input port and a second output port, such that the circuit structure is configured to form a second application circuit as a temperature sensor.

18 Claims, 5 Drawing Sheets

(52) U.S. Cl.
CPC . *B01L 2200/147* (2013.01); *B01L 2300/0645* (2013.01); *B01L 2300/0819* (2013.01); *B01L 2300/1811* (2013.01); *B01L 2300/1894* (2013.01)

(58) Field of Classification Search
CPC ..... B01L 2300/1811; B01L 2300/1894; G05D 23/1928; G05D 23/24
See application file for complete search history.

(56) References Cited

FOREIGN PATENT DOCUMENTS

| | | | |
|---|---|---|---|
| CN | 101983322 | A | 3/2011 |
| CN | 205528801 | U | 8/2016 |
| CN | 110026259 | A | 7/2019 |
| CN | 110554651 | A | 12/2019 |
| CN | 111266139 | A | 6/2020 |
| EP | 1192006 | B1 | 5/2008 |

* cited by examiner

TEMPERATURE CONTROL SYSTEM, DETECTION SYSTEM AND TEMPERATURE CONTROL METHOD FOR MICRO-FLUIDIC CHIP

CROSS-REFERENCE TO RELATED APPLICATIONS

This application is a National Phase Application filed under 35 U.S.C. 371 as a national stage of PCT/CN2021/078127, filed on Feb. 26, 2021, an application claiming priority to Chinese Patent Application No. 202010136822.8, filed on Mar. 2, 2020 to CNIPA, the disclosure of which is incorporated herein by reference.

TECHNICAL FIELD

The present disclosure relates to the field of micro-fluidic technology, in particular to a temperature control system, a detection system and a temperature control method for a micro-fluidic chip.

BACKGROUND

Micro-fluidic technology is a technology for precise control and manipulation of micro-scale fluids, providing simple device structure and packaging, smaller volume, and the ability to process smaller amounts of reagents in parallel. The driving mode of the micro-fluidic technology is varying and includes a mechanical mode, an electrical mode, a magnetic mode, a thermal mode, an optical mode, or the like. Electro-Wetting On Dielectric (EWOD) is one of the most suitable methods due to its low power consumption and simple device fabrication. The EWOD-based digital micro-fluidic technology integrates the operations of generation, transportation, combination and the like of droplets on a micron-scale chip, can simultaneously operate a plurality of droplets, and has the advantages of more flexible control mechanism, higher flux and sensitivity, lower consumption of samples and reagents and the like. The micro-fluidic technology can meet the requirements of automation, integration and portability which are difficult to meet by the traditional analysis system, can realize low reagent consumption detection and rapid automatic detection, and has wide application prospects in the fields such as biology, chemistry, medicine, and environment.

However, in the application of the micro-fluidic chip, some reactions, such as gene detection, are required to be carried out at a specific temperature.

SUMMARY

As an aspect, the present disclosure provides a temperature control system for a micro-fluidic chip, including: a circuit structure disposed in a functional layer of the micro-fluidic chip, corresponding to a reaction zone of the micro-fluidic chip, and including at least two thermistors and a plurality of ports, wherein the plurality of ports includes an input port and an output port, and the input port and the output port are electrically coupled through the at least two thermistors to form an application circuit; and a controller electrically coupled to each of the plurality of ports and configured to select a first input port and a first output port, such that the circuit structure is configured to form a first application circuit as a heating device, and to select a second input port and a second output port, such that the circuit structure is configured to form a second application circuit as a temperature sensor. In the first application circuit, the first input port and the first output port are electrically coupled through a first number of thermistors, and in the second application circuit, the second input port and the second output port are electrically coupled through a second number of thermistors.

In an embodiment, the controller is further configured to: obtain a current temperature of the reaction zone, in response to the circuit structure being configured to form the second application circuit as the temperature sensor; and select the first input port and the first output port, in a case where the current temperature is lower than a first preset temperature, such that the circuit structure is configured to form the first application circuit as the heating device to heat the reaction zone until a temperature of the reaction zone reaches the first preset temperature.

In an embodiment, the circuit structure is configured as at least one of the following: the at least two thermistors are coupled in series, one port is provided at a head end of the at least two series-coupled thermistors and another one port is provided at a tail end of the at least two series-coupled thermistors, and one port is disposed between adjacent thermistors: the at least two thermistors are symmetrically disposed below the reaction zone: or the plurality of ports are divided by a central axis of the reaction zone, with a port on one side of the central axis being the input port and a port on the other side of the central axis being the output port.

In an embodiment, the plurality of ports includes first to third left ports and first to third right ports, and the at least two thermistors includes first to fifth resistors, one end of the first resistor is coupled to the third left port, the other end of the first resistor is coupled to the second left port and one end of the second resistor: the other end of the second resistor and one end of the third resistor are coupled to the first left port: the other end of the third resistor and one end of the fourth resistor are coupled to the first right port: the other end of the fourth resistor and one end of the fifth resistor are coupled to the second right port; and the other end of the fifth resistor is coupled to the third right port.

In an embodiment, the controller is further configured to select the first left port and the first right port, such that the circuit structure is configured to form the first application circuit as the heating device, wherein the first application circuit includes the third resistor.

In an embodiment, the controller is further configured to select the third left port and the third right port, such that the circuit structure is configured to form the second application circuit as the temperature sensor, wherein the second application circuit includes the first to fifth resistors, which are coupled in series.

In an embodiment, the controller is further configured to select the second left port and the second right port, such that the circuit structure is configured to form the first application circuit as the heating device, wherein the first application circuit includes the second to fourth resistors, which are coupled in series.

In an embodiment, the controller is further configured to select the second left port and the first left port, such that the circuit structure is configured to form the first application circuit as the heating device, wherein the first application circuit includes the second resistor, and to select the first left port and the third right port, such that the circuit structure is configured to form the second application circuit as the temperature sensor, wherein the second application circuit includes the third to fifth resistors, which are coupled in series.

In an embodiment, the temperature control system further includes a cooling device electrically coupled to the controller; and the controller is further configured to control the cooling device to cool the reaction zone until a temperature of the reaction zone reaches a second preset temperature.

In an embodiment, the cooling device includes a reservoir and a plurality of first electrodes disposed adjacent to each other at a periphery of the reservoir: a first electrode layer is disposed below the reaction zone and includes a plurality of second electrodes arranged in a matrix: the plurality of first electrodes and the plurality of second electrodes are electrically coupled to the controller; and the controller is further configured to drive, according to a first path, a droplet in the reservoir to flow from one of the plurality of first electrodes, pass through some of the plurality of second electrodes, return to the first electrode, and move into the reservoir through the first electrode.

As another aspect, the present disclosure provides a micro-fluidic detection system, including a micro-fluidic chip, and the temperature control system according to any embodiment of the present disclosure, wherein the micro-fluidic chip includes the reaction zone and the functional layer disposed under the reaction zone, and the circuit structure is disposed in the functional layer.

In an embodiment, the micro-fluidic chip further includes a sample addition zone and a detection zone: the sample addition zone and the detection zone are at two sides of the reaction zone, respectively: a second electrode layer configured to drive a droplet to move is provided under the sample addition zone and the detection zone; and the second electrode layer is electrically coupled to the controller.

As another aspect, the present disclosure provides a temperature control method for a micro-fluidic chip, applied to the temperature control system according to the embodiment of the present disclosure, including: in a heating mode, selecting the second input port and the second output port, such that the circuit structure is configured to form the second application circuit as the temperature sensor; and selecting the first input port and the first output port, such that the circuit structure is configured to form the first application circuit as the heating device.

In an embodiment, the temperature control method further includes: obtaining a current temperature of the reaction zone, in response to the circuit structure being configured to form the second application circuit as the temperature sensor; and selecting the first input port and the first output port, in a case where the current temperature is lower than a first preset temperature, such that the circuit structure is configured to form the first application circuit as the heating device to heat the reaction zone until a temperature of the reaction zone reaches the first preset temperature.

In an embodiment, after the current temperature of the reaction zone is obtained, the method further includes: determining an output duty cycle of a control signal output to the circuit structure based on the current temperature and the first preset temperature, wherein the output duty cycle is configured to control a time period during which the circuit structure is configured to form the temperature sensor or the heating device.

In an embodiment, the temperature control method further includes: in a cooling mode, selecting the second input port and the second output port, such that the circuit structure is configured to form the second application circuit as the temperature sensor to obtain the current temperature of the reaction zone; and controlling the cooling device to cool the reaction zone until the temperature of the reaction zone reaches the second preset temperature, in response to the current temperature being higher than a second preset temperature.

In an embodiment, the cooling device includes a reservoir and a plurality of first electrodes disposed adjacent to each other at a periphery of the reservoir: a first electrode layer is disposed below the reaction zone and includes a plurality of second electrodes arranged in a matrix: the plurality of the first electrodes and the plurality of second electrodes are electrically coupled to the controller; and wherein the controlling the cooling device to cool the reaction zone includes driving, according to a first path, a droplet in the reservoir to flow from one of the plurality of first electrodes, pass through some of the plurality of second electrodes, return to the first electrode, and move into the reservoir through the first electrode.

In an embodiment, the temperature control method further includes: determining a position of a droplet to be reacted; and starting the heating mode before the droplet to be reacted enters the reaction zone.

In an embodiment, the temperature control method further includes: determining a position of a reacted droplet; and starting the cooling mode after the reacted droplet exits the reaction zone.

The additional aspects and advantages of the present disclosure will be partly given in the following description, which will become obvious from the following description, or be learned through the practice of the present disclosure.

BRIEF DESCRIPTION OF THE DRAWINGS

The above and/or additional aspects and advantages of the present disclosure will become obvious and easy to understand from the following description of the embodiments in conjunction with the accompanying drawings, in which.

DETAILED DESCRIPTION

Figure 1:
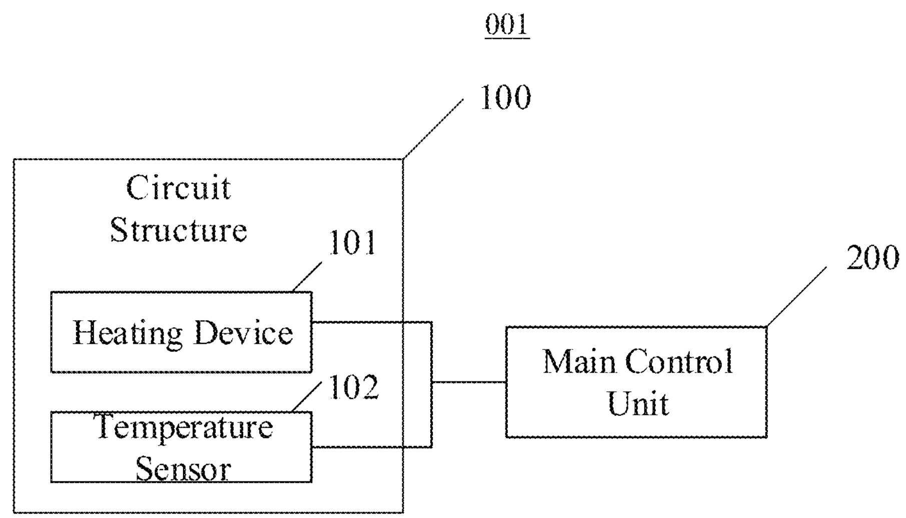
FIG. 1 is a schematic structural diagram of a temperature control system for a micro-fluidic chip according to an embodiment of the present disclosure.

The present disclosure is described in detail below and examples of embodiments of the present disclosure are illustrated in the accompanying drawings, throughout which like reference numerals refer to the same or similar elements or elements with the same or similar functionality. In addition, a detailed description of the known art, which is unnecessary for the features shown in the present disclosure, will be omitted. The embodiments described below with reference to the accompanying drawings are exemplary only for explaining the present disclosure and are not construed as limiting the present disclosure.

It will be understood by those skilled in the art that, unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the prior art and will not be interpreted in an idealized or overly formal sense unless expressly so defined herein.

As used herein, the singular forms "a", "an", "said" and "the" are intended to include the plural forms as well, unless the context clearly indicates otherwise. It will be further understood that the terms "include" and/or "comprise," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may also be present. Further, "connected" or "coupled" as used herein may include wirelessly connected or wirelessly coupled. As used herein, the term "and/or" includes all or any one or any combination of one or more of the associated listed items.

In the following, specific embodiments are used to describe in detail the technical solutions of the present disclosure and how the technical solutions of the present disclosure solve the above-mentioned technical problems.

Figure 2:
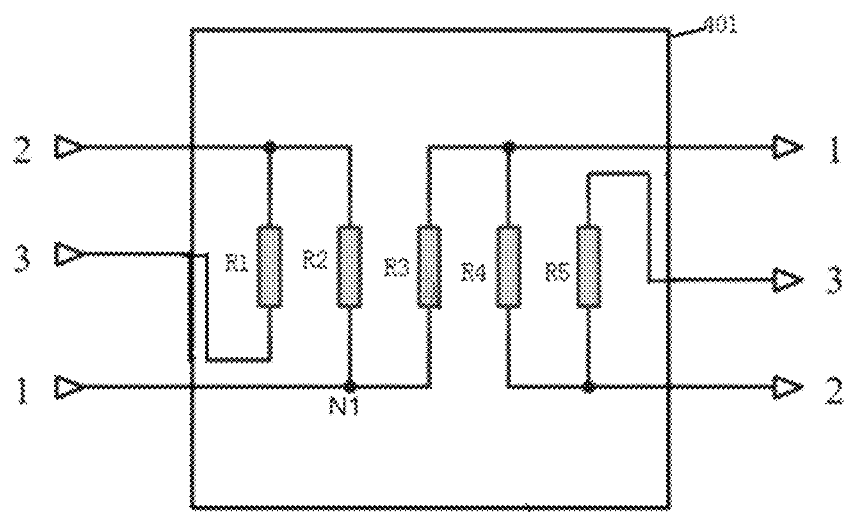
FIG. 2 is a schematic structural diagram of a circuit structure according to an embodiment of the present disclosure.

An embodiment of the present disclosure provides a temperature control system for a micro-fluidic chip, and referring to FIGS. 1 and 2, the temperature control system 001 includes a circuit structure 100 and a main control unit 200.

The circuit structure 100 is configured to be disposed in a functional layer 401 of a micro-fluidic chip 400 and corresponds to a reaction zone 402 of the micro-fluidic chip 400. In an embodiment, an orthographic projection of the circuit structure 100 on the reaction zone 402 is within the reaction zone 402. The circuit structure 100 includes at least two thermistors (e.g., five thermistors R1-R5) and a plurality of ports, which include input ports and output ports. One input port and one output port are electrically coupled through a specific number of thermistors to form an application circuit having a specific resistance value.

The main control unit 200 is electrically coupled to each port and is configured to select an input port and/or an output port to form application circuits having different resistance values, so that the circuit structure 100 can be switched between being used as a heating device 101 and being used as a temperature sensor 102.

It has been considered that the optimal resistance value of the circuit structure 100 should be different when being used as the heating device 101 or as the temperature sensor 102. In a case where the circuit structure 100 is used as the temperature sensor 102, a larger resistance value should be selected to have a higher sensitivity, thereby achieving better temperature accuracy. In a case where the circuit structure 100 is used as the heating device 101, a smaller resistance value should be selected to have a larger heating power under the condition of a constant input voltage. Therefore, the circuit structure 100 of the present disclosure includes at least two thermistors and a plurality of ports, and one input port and/or one output port are/is electrically coupled through the thermistors to form application circuits having different resistance values, so that different application circuits can be selected according to actual needs, and the function that the circuit structure 100 can serve as both the heating device 101 and the temperature sensor 102 is realized.

The circuit structure 100 in the embodiment of the present disclosure includes at least two thermistors, and the thermistors can heat the reaction zone 402 after being powered. Meanwhile, the resistance values thereof change due to the temperature change, and the temperature of the reaction zone 402 may be obtained by the circuit structure 100 used as the temperature sensor 102. The main control unit 200 selects a corresponding input port and/or output port, so that the circuit structure 100 can be used as the heating device 101 to heat the reaction zone 402, and can also be used as the temperature sensor 102 to acquire the temperature of the reaction zone 402 in real time. The appropriate combination of the input port and the output port can be selected according to the required heating power and the temperature control precision, so that the accurate temperature control on the reaction zone 402 can be realized, and the reaction (such as gene detection) which needs to be carried out at a specific temperature can be ensured.

Further, a multiplexing of the circuit structure 100 is realized in the embodiment of the present disclosure, so that the circuit structure has two functions of heating and temperature monitoring, and the two functions do not interfere with each other and have a good performance. Thus, the temperature of the reaction zone 402 can be controlled in real time, thereby ensuring that the reaction zone 402 is always at the required temperature.

Further, the micro-fluidic detection system according to the embodiment of the present disclosure includes a micro-fluidic chip 400 and a temperature control system for the micro-fluidic chip 400, and the circuit structure 100 is disposed in the functional layer 401 of the micro-fluidic chip 400, so that the circuit structure 100 (i.e., the heating device 101 and the temperature sensor 102) is completely integrated inside the chip. In an embodiment, the main control unit 200 may be a controller. For example, the main control unit 200 is built on the existing microcontroller of the micro-fluidic chip 400. Therefore, an additional temperature control system is not needed, so that the volumes of the temperature control system and the detection system are not additionally increased, and the cost is lower.

It has been considered that, the multiplexing of the circuit structure 100 means the multiplexing of the functional layer 401, and in a case where the two functions are performed simultaneously, the superposition of two control signals from the main control unit 200 may cause the actual effect to be different from the expected effect. In the embodiment of the present disclosure, time division multiplexing of the circuit structure 100 is performed, and heating is stopped when temperature acquisition is performed. After the temperature acquisition, a certain time period may be allocated to the heating device 101, and the temperature sensor 102 stops working during the time period. In this case, the operating time ratio of the heating device 101 may be obtained from the output duty cycle calculated by the main control unit 200. In practical applications, a distribution pattern of the thermistors may be formed in advance in the circuit structure 100, in which two branches of the temperature sensor 102 and the heating device 101 are formed and corresponding input port and output port are selected to form at least two application circuits with different resistance values, thereby avoiding multiplexing of the same application circuit. In practical applications, in order to ensure that the functions of the circuit structure 100 as the heating device 101 and as the temperature sensor 102 are not affected by each other, multiplexing of the same thermistor may also be avoided.

In an embodiment, the main control unit 200 is configured to control at least one application circuit to form the temperature sensor 102, thereby obtaining a current temperature of the reaction zone 402. When the current temperature is lower than a first preset temperature, the input port and/or the output port are switched, so that at least one application circuit forms the heating device 101 to heat the reaction zone 402, until the temperature of the reaction zone 402 reaches the first preset temperature.

In an embodiment, the temperature sensor 102 may include at least one application circuit, and the resistance value of each application circuit is determined by measuring the current value of each application circuit. Each of the application circuits is used as a temperature sensor 102 to obtain a current temperature of a reaction zone 402 according to a preset correspondence relationship between the resistance value of the application circuit and the temperature. If there are a plurality of application circuits, an average value for the plurality of application circuits may be obtained. Alternatively, a final current temperature may be calculated according to the current temperature acquired by each application circuit and a preset weight. The heating device 101 may also include at least one application circuit. The number of the application circuits and the selection of which circuit to use may be adjusted based on the current temperature, which facilitates uniform heating of the reaction zone 402 and also facilitates accurate temperature control based on the conditions of the reaction zone 402.

In an embodiment, three thermistors are coupled in series between the second input port 2 and the second output port 2, and the first input port 1 is coupled to a node N1 between adjacent thermistors.

In an embodiment, the at least two thermistors are symmetrically disposed below the reaction zone 402 to ensure uniform heating of the reaction zone 402 and reduce errors. In practical applications, when the circuit structure 100 is used as the heating device 101 and the temperature sensor 102, the resistance distribution thereof may be symmetrical with respect to a central axis of the reaction zone 402.

In an embodiment, the plurality of ports are divided by the central axis of the reaction zone 402, with the port(s) on one side of the central axis being the input port(s) and the port(s) on the other side of the central axis being the output port(s).

In an embodiment, the main control unit 200 may be used as a power supply of the circuit structure 100, or a power supply electrically coupled to the main control unit 200 may be additionally provided. The power supply is electrically coupled to a port of the circuit structure 100, and when the circuit structure 100 is used as the heating device 101, the main control unit 200 controls the power supply to be electrically coupled to the application circuit, so as to heat the reaction zone 402.

Referring to FIG. 2, as an example, a schematic diagram of the circuit structure 100 is provided. In the figure, five thermistors R1-R5 are provided in series, and the resistance values of the thermistors may be the same or different. The five thermistors are located in the functional layer 401 and are symmetrically disposed below the reaction zone 402. In the embodiment, a pair of first ports 1 forms a first application circuit, a pair of second ports 2 forms a second application circuit, and a pair of third ports 3 forms a third application circuit. For example, the ports located on the left side of the central axis of reaction zone 402 are input ports and the ports located on the right side of the central axis of reaction zone 402 are output ports. The present circuit structure 100 provides three application circuits having resistance values different from each other. The pair of first ports 1 and a resistor R3 form an application circuit with a small resistance value, the pair of second ports 2, a resistor R2, the resistor R3 and a resistor R4 form an application circuit with a medium resistance value, and the pair of third ports 3 and the resistors R1 to R5 form an application circuit with a large resistance value. In practical applications, the third application circuit formed by the pair of third ports 3 may be used as the temperature sensor 102, and the first application circuit formed by the pair of first ports 1 and/or the second application circuit formed by the pair of second ports 2 may be used as the heating device 101 to heat the reaction zone 402. In an embodiment, a fourth application circuit that is used as the heating device 101 may be formed by the resistor R2, the first port 1 and the second port 2. A fifth application circuit that is used as the temperature sensor 102 may be formed by the resistor R3, the resistor R4, the resistor R5, the first port 1 and the third port 3. In this case, the first port 1 may serve as an input port, and the second port 2 and the third port 3 may serve as output ports. In this way, the functions of the circuit structure 100 as the heating device 101 and as temperature sensor 102 can be further ensured to be independent of each other, and the multiplexing of the same resistor can also be avoided.

In an embodiment, the thermistor may have an elongated shape, and a plurality of thermistors are arranged in a serpentine shape below the reaction zone 402. The resistance value of the application circuit formed by the thermistor(s) may range from several ohms to several thousand ohms. For example, the resistance value of the thermistor may be set according to actual temperature requirements.

Figure 3:
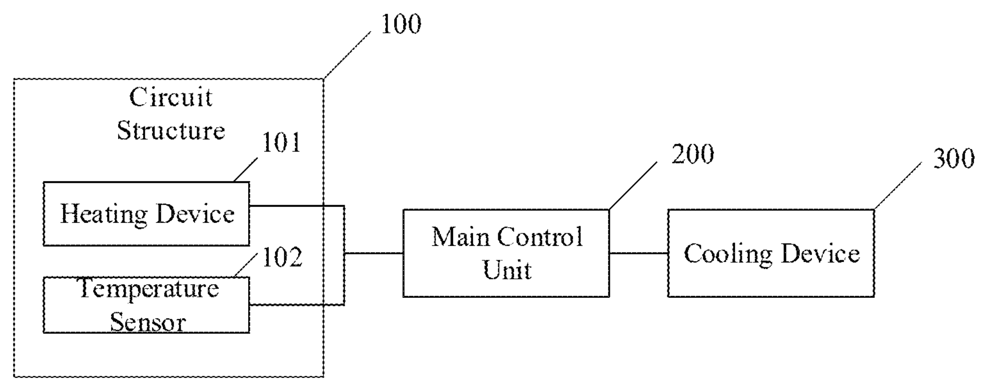
FIG. 3 is a schematic structural diagram of another temperature control system for a micro-fluidic chip according to an embodiment of the present disclosure.

In an embodiment, referring to FIG. 3, the temperature control system further includes a cooling device 300 electrically coupled to the main control unit 200. The main control unit 200 is further configured to control the cooling device 300 to cool the reaction zone 402 until the temperature of the reaction zone 402 reaches a second preset temperature.

Figure 4:
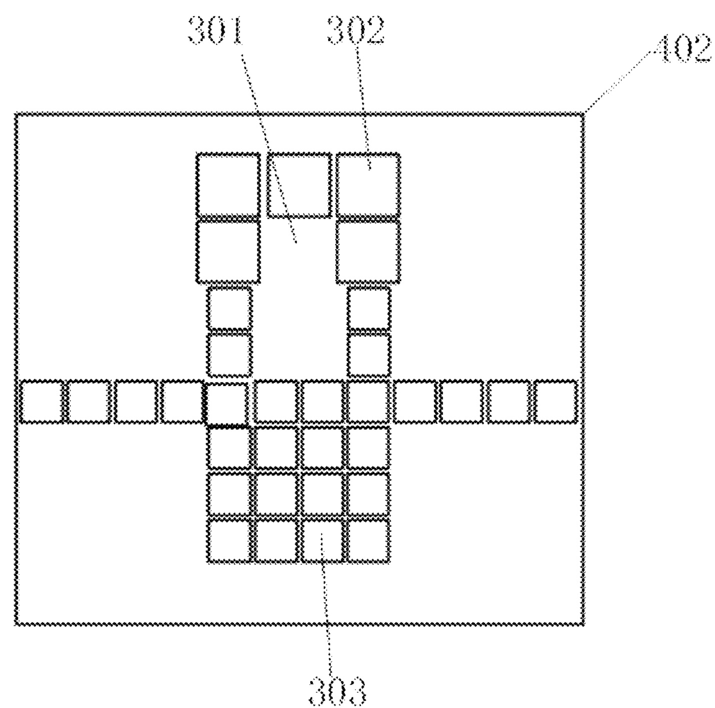
FIG. 4 is a schematic structural diagram of a cooling device corresponding to a reaction zone and showing an arrangement of first electrodes and second electrodes, according to an embodiment of the present disclosure.

In an embodiment, as shown in FIGS. 3 and 4, the cooling device 300 includes a reservoir 301 and a plurality of first electrodes 302 disposed adjacent to each other in sequence at the periphery of the reservoir 301. An electrode layer including a plurality of second electrodes 303 arranged in a matrix is provided below the reaction zone 402. The first electrode 302 and the second electrode 303 are both electrically coupled to the main control unit 200. The main control unit 200 is configured to drive, according to a preset path, the cooling droplet in the reservoir 301 to flow from the first electrode 302, pass through some of the plurality of second electrodes 303, return to another first electrode 302, and then move into the reservoir 301 through the first electrode 302.

Referring to FIG. 4, as an example, the first electrodes 302 and the second electrodes 303 are located on the same plane, the first electrodes 302 and the second electrodes 303 may be existing electrodes in the reaction zone 402 of the micro-fluidic chip 400, the first electrodes 302 may also be disposed in the micro-fluidic chip 400 according to a cooling requirement, the first electrodes 302 are sequentially arranged according to a predetermined arrangement mode, a middle region surrounded by the plurality of first electrodes 302 may serve as the reservoir 301, the reservoir 301 may contain cooling water, the first electrodes 302 at two ends of the plurality of first electrodes 302 are respectively adjacent to one of the second electrodes 303, so that the cooling water moves from the first electrode 302 at one side to the second electrodes 303, then returns to the first electrode 302 at the other side, and then flows back to the reservoir 301. In practical applications, the first electrode 302 and the second electrode 303 are both electrically coupled to a power supply, and the main control unit 200 sequentially drives the electrodes to be powered according to a preset time sequence, so that the droplets can move along a preset path.

The cooling device 300 in the embodiment of the present disclosure can cool the reaction zone 402. In the cooling device 300, the main control unit 200 sequentially controls the powered-on/powered-off states of the electrodes to electrically drive the cooling droplets in the reservoir 301 to flow from the first electrode 302 to another first electrode 302 after passing through multiple second electrodes 303 according to a preset path, and then to flow back to the reservoir 301. In an embodiment, the cooling of the cooling device 300 is based on the existing electrodes of the micro-fluidic chip 400, and the cooling droplets may also be water drops which are easily obtained. Therefore, no additional cooling device is needed, and the volumes of the temperature control system and the detection system are not additionally increased, and the cost is lower.

Figure 5:
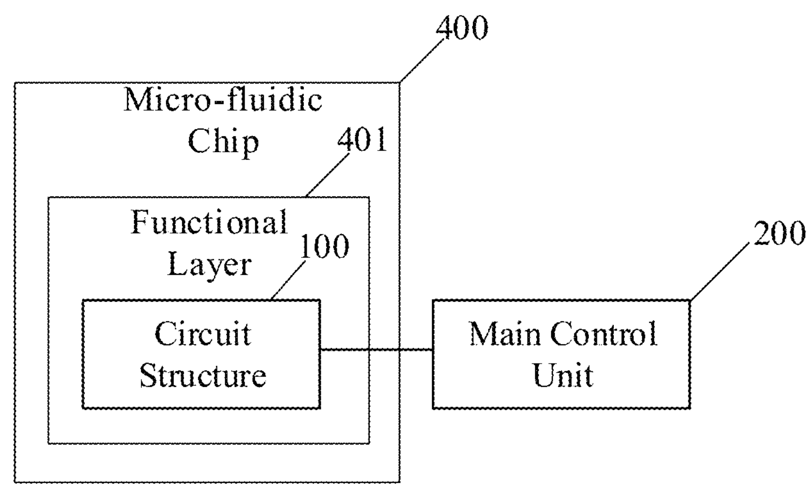
FIG. 5 is a schematic structural diagram of a micro-fluidic detection system according to an embodiment of the present disclosure.

Based on the same inventive concept, an embodiment of the present disclosure further provides a micro-fluidic detection system, and as shown in FIG. 5, the micro-fluidic detection system includes the micro-fluidic chip 400 and the temperature control system for the micro-fluidic chip provided by the embodiment of the present disclosure.

The micro-fluidic chip 400 includes a reaction zone 402 and a functional layer 401 disposed below the reaction zone 402, and the circuit structure 100 is disposed in the functional layer 401. In order to show the structure of the functional layer 401, the reaction zone 402 is not shown in the figure.

Figure 6:
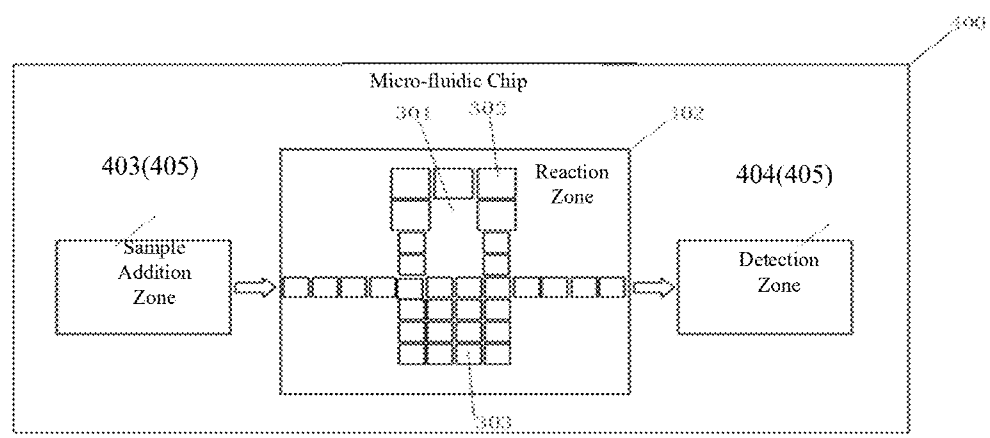
FIG. 6 is a schematic structural diagram of a micro-fluidic chip according to an embodiment of the present disclosure.

In an embodiment, referring to FIG. 6, the micro-fluidic chip 400 further includes a sample addition zone 403 and a detection zone 404. The sample addition zone 403 and the detection zone 404 are respectively located at two sides of the reaction zone 402. An electrode layer 405 for driving droplets to move is arranged below each of the sample addition zone 403 and the detection zone 404. In the figure, the electrode layer is electrically coupled to the main control unit 200, and the functional layer 401 of the micro-fluidic chip 400 is located below the reaction zone 402. The main control unit 200 is configured to control the powered-on/powered off of each electrode of the electrode layer to realize the movement of the droplet. The front end of the reaction zone 402 is coupled to the sample addition zone 403, and the rear end of the reaction zone 402 is coupled to the detection zone 404.

In an embodiment, in practical applications, the sample and the reagent move from the sample addition zone 403 into the reaction zone 402 under the driving of the electrodes, circulate in the reaction zone 402 when reacting in the reaction zone 402 until the reaction is completed, and exit the reaction zone 402 after being uniformly mixed and enter the detection zone 404. In an embodiment, when the sample and the reagent are mixed and react in the reaction zone 402, the reaction zone 402 should be kept at a constant temperature to let the enzyme have the maximum activity, so that the detection system of the present disclosure can obtain better reaction and detection effects.

In an embodiment, as an example, referring to FIG. 6, the detection system further includes a cooling device 300, and the cooling device 300 includes a reservoir 301 and a plurality of first electrodes 302 disposed adjacent to each other in sequence at the periphery of the reservoir 301. An electrode layer including a plurality of second electrodes 303 arranged in a matrix is provided below the reaction zone 402. The first electrode 302 and the second electrode 303 are both electrically coupled to the main control unit 200. The main control unit 200 is configured to drive, according to a preset path, the cooling droplets in the reservoir 301 to flow from the first electrode 302, pass through some of the plurality of second electrodes 303, return to another first electrode 302, and then move into the reservoir 301 through the first electrode 302. The main control unit 200 controls the cooling droplets to move according to a preset path, so that the moving path of the cooling droplets in the reaction zone 402 can be better ensured, and the cooling effect on the reaction zone 402 is improved.

Figure 7:
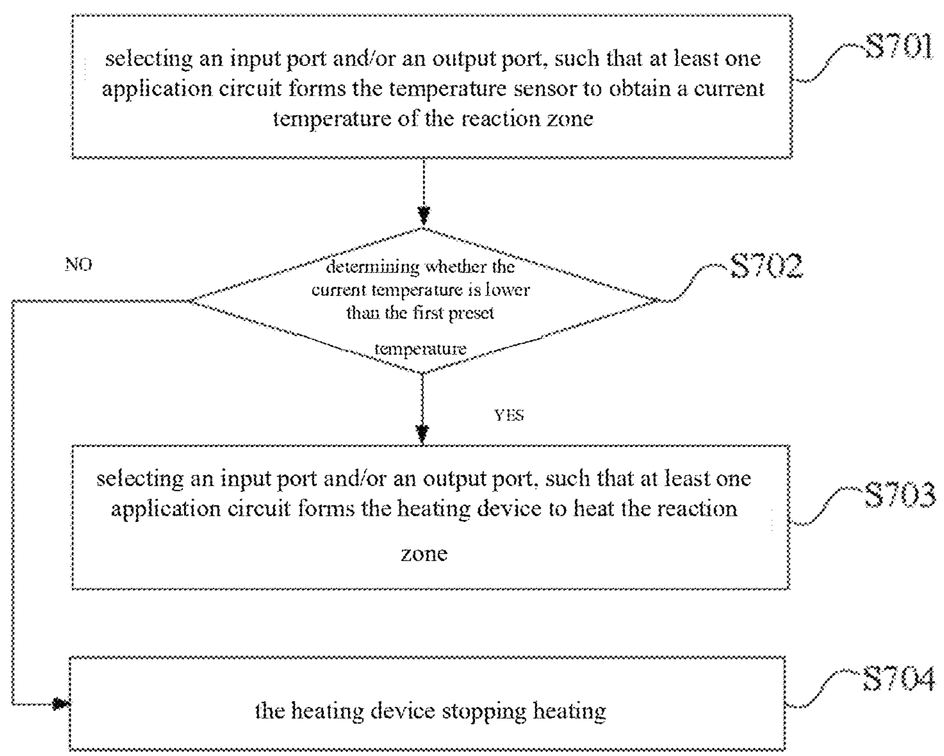
FIG. 7 is a flowchart of a heating mode of a temperature control method for a micro-fluidic chip according to an embodiment of the present disclosure.

Based on the same inventive concept, an embodiment of the present disclosure provides a temperature control method for a micro-fluidic chip, which is applied to the temperature control system for the micro-fluidic chip provided by the embodiment of the present disclosure, and the temperature control method includes a heating mode and a cooling mode, as shown in FIG. 7.

When in the heating mode, an input port and/or an output port are (is) selected to form an application circuit having a specific resistance value, such that the circuit structure 100 is switched between being the heating device 101 and being the temperature sensor 102.

In an embodiment, the step of the input port and/or the output port being selected to form the application circuit having a specific resistance value, such that the circuit structure 100 is switched between being the heating device 101 and being the temperature sensor 102, includes steps S701 to S704.

Step S701 includes selecting an input port and/or an output port (e.g., a pair of third ports 3) such that at least one application circuit forms the temperature sensor 102 to obtain a current temperature of the reaction zone 402.

In an embodiment, the temperature sensor 102 may include at least one application circuit, and the resistance value of each application circuit is determined by measuring the current value of each application circuit. Each of the application circuits is used as a temperature sensor 102 to obtain a current temperature of a reaction zone 402 according to a preset correspondence relationship between the resistance value of the application circuit and the temperature. If there are a plurality of application circuits, an average value for the plurality of application circuits may be obtained. Alternatively, a final current temperature may be calculated according to the current temperature acquired by each application circuit and a preset weight.

In an embodiment, in step S701, after controlling the at least one application circuit to form the temperature sensor 102 to obtain the current temperature of the reaction zone 402, the method further includes: determining an output duty cycle of a control signal output to the circuit structure 100 according to the current temperature and a first preset temperature: the output duty cycle is used for controlling the time for which the circuit arrangement 100 acts as the temperature sensor 102 or the heating device 101, respectively.

In practical applications, the circuit structure 100 stops heating when the circuit structure 100, as the temperature sensor 102, performs temperature collection. After the temperature collection, a certain time period is allocated to the heating device 101 according to the difference between the current temperature and the first preset temperature, and the temperature sensor 102 stops working in the time period. In this case, the operating time ratio of the heating device 101 may be obtained from the output duty cycle calculated by the main control unit 200. Meanwhile, the combination of the input port and the output port is determined by calculation of the main control unit 200 according to the setting parameter (the first preset temperature). For example, when the current temperature is close to the first preset temperature, the operating time of the temperature sensor 102 may be selected to be 0.9 seconds per second, and the operating time of the heating device 101 may be selected to be 0.1 second per second; and when the current temperature and the first preset temperature have a large difference, the operating time of the temperature sensor 102 may be selected to be 0.1 second per second, the operating time of the heating device 101 may be selected to be 0.9 seconds per second, to lengthen the heating time. According to the embodiment of the present disclosure, the temperature of the reaction zone 402 can reach the first preset temperature as soon as possible, and the heating efficiency is improved while the energy is saved.

Step S702 includes determining whether the current temperature is lower than the first preset temperature. When the current temperature is lower than the first preset temperature, step S703 is performed, and when the current temperature is not lower than the first preset temperature, step S704 is performed.

Step S703 includes selecting an input port and/or an output port (e.g., a pair of first ports 1) such that at least one application circuit (e.g., the first application circuit) forms the heating device 101 to heat the reaction zone 402.

In an embodiment, the heating device 101 may also include at least one application circuit, and the number of application circuits and the selection of which application circuit to use may be adjusted according to the current temperature, so as to uniformly heat the reaction zone 402 and to perform precise temperature control according to the condition of the reaction zone 402.

Step S704 includes the heating device 101 stopping heating.

In the embodiment of the present disclosure, steps S701 to S704 are a continuous loop process when the temperature control system is in the heating mode, until the temperature of the reaction zone 402 reaches the first preset temperature. The first preset temperature is set according to the actual needs of the reaction, in which set parameters, heating temperature and tolerance errors are input. That is, the first preset temperature may have an error range, within which it is determined that the first preset temperature is reached. When no temperature is input, the parameter may take a default value.

Figure 8:
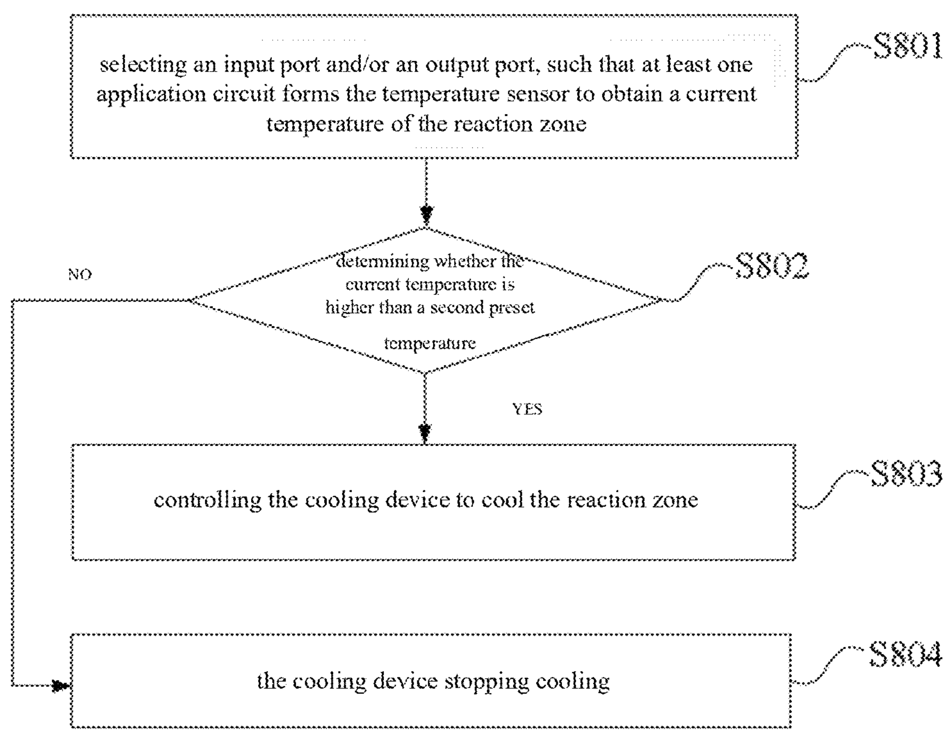
FIG. 8 is a flowchart of a cooling mode of a temperature control method for a micro-fluidic chip according to an embodiment of the present disclosure.

In an embodiment, referring to FIG. 8, when in the cooling mode, the temperature control method for the micro-fluidic chip includes steps S801 to S804.

Step S801 includes selecting an input port and/or an output port (e.g., a pair of third ports 3) such that at least one application circuit forms the temperature sensor 102 to obtain a current temperature of the reaction zone 402.

The principle of obtaining the current temperature of the reaction zone 402 in step S801 of the present embodiment is consistent with that in step S701 of the above-described embodiment.

Step S802 includes determining whether the current temperature is higher than a second preset temperature. When the current temperature is higher than the second preset temperature, step S803 is performed, and when the current temperature is not higher than the second preset temperature, step S804 is performed.

Step S803 includes controlling the cooling device 300 to cool the reaction zone 402.

In an embodiment, the cooling device 300 includes a reservoir 301 and a plurality of first electrodes 302 disposed adjacent to each other in sequence at the periphery of the reservoir 301: an electrode layer is arranged below the reaction zone 402, and the electrode layer includes a plurality of second electrodes 303 arranged in a matrix: the first electrode 302 and the second electrode 303 are both electrically coupled to the main control unit 200.

The controlling the cooling device 300 to cool the reaction zone 402 in step S803, includes: driving, according to a preset path, the cooling droplets in the reservoir 301 to flow from the first electrode 302, pass through some of the plurality of second electrodes 303, return to another first electrode 302, and then move into the reservoir 301 through the first electrode 302.

In practical applications, the first electrode 302 and the second electrode 303 are both electrically coupled to a power supply, and the main control unit 200 sequentially controls the electrodes to be powered according to a preset time sequence, so that the droplets can move along a predetermined path.

Step S804 includes the cooling device 300 stopping cooling.

In an embodiment, the temperature control method for the micro-fluidic chip further includes: determining a position of a droplet to be reacted: the heating mode is performed before the droplet to be reacted enters into the reaction zone 402. The heating mode is started before the droplet enters into the reaction zone 402, so that when the droplet enters into the reaction zone 402, the temperature in the reaction zone 402 is constant, thereby improving the reaction efficiency and ensuring the reaction effect.

In an embodiment, the main control unit 200 controls the powered-on/powered-off states of each electrode of the electrode layer to drive the droplet to move. Meanwhile, the number and position of the electrode are pre-stored in the main control unit 200, so that the position of the droplet can be determined according to the position of the electrode where the droplet is located.

In an embodiment, the temperature control method for the micro-fluidic chip further includes: determining the position of the reacted droplet; after the reacted droplet exits the reaction zone 402, performing the cooling mode. In practical applications, the reaction zone 402 is cooled after it is ensured that no more reaction is performed in the reaction zone 402, i.e., the reacted droplet has left the reaction zone 402.

As an example, the temperature control method of the present disclosure includes a heating mode and a cooling mode. When temperature control is required, the temperature sensor 102 obtains the temperature of the reaction zone 402 in real time and transmits the current temperature value to the main control unit 200. The main control unit 200 compares the current temperature value with a preset temperature according to the current mode, i.e., the heating mode or the cooling mode, and calls the heating device 101 or the cooling device 300 according to the result. If it is in the heating mode, the heating device 101 is called to perform a heating operation, so that the temperature of the reaction zone 402 reaches the first preset temperature and is kept constant until it is switched to the cooling mode: if it is in the cooling mode, the cooling device 300 is called to perform a cooling operation until the temperature of the reaction zone 402 reaches the second preset temperature.

As an example, before the sample and reagent enter into the reaction zone 402 for mixing, the heating mode may be performed to heat the reaction zone 402 in advance to a desired first preset constant temperature. In practical applications, the set parameters including heating temperature, cooling temperature, and tolerance error are input, so that the main control unit 200 stores the corresponding parameters in advance. When there is no input, all the parameters may take default values. Meanwhile, a suitable port combination for the two functions of the heating device 101 and the temperature sensor 102 may be selected according to the accuracy of the required temperature and the required heating power, and the port combination is calculated by the main control unit 200 according to the set parameters. After initialization is complete, the heating mode is entered, and the reaction zone 402 is maintained at a constant temperature until the droplet exits the reaction zone 402 and no pre-heating process for the next droplet is required. After the droplet leaves the reaction zone 402, the cooling process may begin until the temperature in the reaction zone 402 drops to the second preset temperature (which may be room temperature or some other preset temperatures), and the entire temperature control process ends.

As an example, in the heating mode, the temperature sensor 102 collects the current temperature of the reaction zone 402 and transmits the current temperature to the main control unit 200. The main control unit 200 calculates the difference between the current temperature and the first preset temperature, and if the difference is not within the allowable range of the temperature accuracy, the output duty cycle is calculated by using a control algorithm, so that the heating device 101 operates at the required heating power. The process is circularly carried out until the current temperature reaches the first preset temperature. If a mode switching signal from the main control unit 200 is not received, the heating mode is performed, and the above circulation is continued: if the mode switching signal is received, the heating mode is finished, and the cooling mode is entered.

As an example, in the cooling mode, the temperature sensor 102 collects the current temperature of the reaction zone 402 and transmits the current temperature to the main control unit 200, and the main control unit 200 calculates the difference between the current temperature and the second preset temperature. If the difference is not within the allowable range of the temperature accuracy, the cooling is required to be continued, and at this time, the first electrode 302 around the reservoir 301 is driven according to the timing set in advance by the main control unit 200, so that one droplet is generated from the reservoir 301, and the droplet may flow in the reaction zone 402 for one circle and then return to the reservoir 301 from the first electrode 302 on the other side, and the next cycle is entered. In practical applications, the temperature acquisition for the next cycle may be performed in advance as the current droplet is about to enter the first electrode 302, so as to increase the cooling speed. When the temperature in the reaction zone 402 reaches the second preset temperature (which may be the room temperature or other preset temperature), the cooling process is completed, and the entire temperature control process is finished.

The embodiment of the present disclosure can at least realize the following beneficial technical effects:

(1) The temperature control system of the embodiment of the present disclosure includes a circuit structure 100 and a main control unit 200, wherein the main control unit 200 is electrically coupled to each port of the circuit structure and is configured to select a corresponding input port and/or a corresponding output port to form application circuits having different resistance values, so that the circuit structure 100 is switched between being used as a heating device 101 to perform a heating operation and being used as a temperature sensor 102 to measure a temperature. The circuit structure 100 of the embodiment of the present disclosure is formed by at least two thermistors which can heat the reaction zone 402 after being powered. Meanwhile, the resistance values thereof change due to the temperature change, and the temperature of the reaction zone 402 can be obtained by the circuit structure 100 used as the temperature sensor 102. By selecting an input port and/or an output port by the main control unit 200, the circuit structure 100 can be used as the heating device 101 to heat the reaction zone 402 and can also be used as the temperature sensor 102 to collect the temperature of the reaction zone 402 in real time. The appropriate combination of the input port and the output port can be selected according to the required heating power and the temperature control precision, so that the accurate temperature control on the reaction zone 402 can be realized, and the reaction (such as gene detection) which needs to be carried out at a specific temperature can be ensured.

(2) The multiplexing of the circuit structure 100 is realized in the embodiment of the present disclosure, so that the circuit structure has two functions of heating and temperature monitoring, and the two functions do not interfere with each other and have a good performance. Thus, the temperature of the reaction zone 402 can be controlled in real time, thereby ensuring that the reaction zone 402 is always at the required temperature.

(3) The cooling device 300 in the embodiment of the present disclosure can cool the reaction zone 402. In the cooling device 300, the electrodes are sequentially controlled to be powered-on/powered-off to drive the cooling droplet in the reservoir 301 to flow from the first electrode 302 to another first electrode 302 after passing through multiple second electrodes 303 according to a preset path, and then to flow back to the reservoir 301. The cooling of the cooling device 300 is based on the existing electrodes of the micro-fluidic chip 400, and the cooling droplets may also be water drops which are easily obtained. Therefore, no additional cooling device is needed, and the volumes of the temperature control system and the detection system are not additionally increased, and the cost is lower.

(4) The micro-fluidic detection system according to the embodiment of the present disclosure includes a micro-fluidic chip 400 and a temperature control system for the micro-fluidic chip 400, and the circuit structure 100 is disposed in the functional layer 401 of the micro-fluidic chip 400, so that the circuit structure 100 (i.e., the heating device 101 and the temperature sensor 102) is completely integrated inside the chip. The main control unit 200 is built on the existing microcontroller of the micro-fluidic chip 400. Therefore, an additional temperature control system is not needed, so that the volumes of the temperature control system and the detection system are not additionally increased, and the cost is lower.

Those skilled in the art will understand that various steps, measures, and schemes in the operations, methods and flow discussed in this application can be alternated, modified, combined, or deleted. Further, other steps, measures, and schemes having the operations, methods and flow discussed in this application can also be alternated, modified, rearranged, decomposed, combined, or deleted. Further, various steps, measures, and schemes in operations, methods and flow in the prior art, which have been disclosed in the present disclosure can also be alternated, modified, rearranged, decomposed, combined, or deleted.

In the description of the present disclosure, it is to be understood that the terms "center", "upper", "lower", "front", "rear", "left", "right", "vertical", "horizontal", "top", "bottom", "inner", "outer", and the like indicate orientations or positional relationships based on those shown in the drawings, merely for convenience of description and simplicity of description, and do not indicate or imply that the devices or elements referred to must have a particular orientation, be constructed and operated in a particular orientation, and thus, are not to be construed as limiting the present disclosure.

The terms "first", "second" are used for descriptive purposes only and are not to be construed as indicating or implying relative importance or to implicitly indicate the number of technical features indicated. Thus, a feature defined by "first" or "second" may explicitly or implicitly includes one or more of that feature. In the description of the present disclosure, the meaning of "plurality" is two or more unless otherwise specified.

In the description of the present disclosure, it should be noted that, unless otherwise explicitly stated or limited, the terms "mounted", "connected", and "coupled" are to be construed broadly, and may be, for example, a fixed connection, a detachable connection, or an integral connection: or may be connected directly or indirectly through intervening media, or may be interconnected between two elements. The specific meaning of the above terms in this application will be understood under specific circumstances for those of ordinary skill in the art.

In the description of the present application, the particular features, structures, materials, or characteristics may be combined in any suitable manner in any one or more embodiments or examples.

It should be understood that, although the steps in the flowcharts of the figures are shown in order as indicated by the arrows, the steps are not necessarily performed in order as indicated by the arrows. The steps are not performed in the exact order shown and may be performed in other orders unless otherwise indicated herein. Moreover, at least a portion of the steps in the flow chart of the figure may include multiple sub-steps or multiple stages, which are not necessarily performed at the same time, but may be performed at different times, and the order of execution is not necessarily sequential, but may be performed alternately or alternately with other steps or at least a portion of the sub-steps or stages of other steps.

The foregoing is only a few embodiments of the present disclosure and it should be noted that those skilled in the art can make various improvements and modifications without departing from the principle of the present disclosure, and that these improvements and modifications should also be considered as the protection scope of the present disclosure.

What is claimed is:

1. A temperature control system for a micro-fluidic chip, comprising:

a circuit structure in a functional layer of the micro-fluidic chip, corresponding to a reaction zone of the micro-fluidic chip, and comprising a plurality of thermistors and a plurality of ports, wherein the plurality of ports comprises input ports and output ports, and the input ports are electrically coupled to the output ports are electrically through at least one of the plurality of thermistors to form application circuits, respectively; and a controller electrically coupled to each of the plurality of ports and configured to select a first input port and a first output port among the plurality of ports, such that the circuit structure is configured to form a first application circuit as a heating device, and to select a second input port and a second output port among the plurality of ports, such that the circuit structure is configured to form a second application circuit as a temperature sensor, wherein the first application circuit; comprises the first input port, the first output port and a first number of thermistors among the plurality of thermistors electrically coupled between the first input port and the first output port, and the second application circuit comprises, the second input port, the second output port, and a second number of thermistors among the plurality of thermistors electrically coupled between the second input port and the second output port, wherein the controller is further configured to:

obtain a current temperature of the reaction zone, in response to the circuit structure being configured to form the second application circuit as the temperature sensor; and select the first input port and the first output port, in a case where the current temperature is lower than a first preset temperature, such that the circuit structure is configured to form the first application circuit as the heating device to heat the reaction zone until a temperature of the reaction zone reaches the first preset temperature.

2. The temperature control system of claim 1, wherein the circuit structure is configured as at least one of the following:

the first input port is coupled to a node between adjacent thermistors of the second application circuit;

the plurality of thermistors are symmetrically disposed below the reaction zone; or the plurality of ports are divided by a central axis of the reaction zone, with some ports on one side of the central axis being the input port and remaining ports on the other side of the central axis being the output port.

3. The temperature control system of claim 1, wherein the plurality of ports comprises first to third left ports and first to third right ports, and the plurality of thermistors comprises first to fifth resistors, one end of the first resistor is coupled to the third left port, the other end of the first resistor is coupled to the second left port and one end of the second resistor;

the other end of the second resistor and one end of the third resistor are coupled to the first left port;

the other end of the third resistor and one end of the fourth resistor are coupled to the first right port;

the other end of the fourth resistor and one end of the fifth resistor are coupled to the second right port; and the other end of the fifth resistor is coupled to the third right port.

4. The temperature control system of claim 3, wherein the controller is further configured to select the first left port and the first right port, such that the circuit structure is configured to form the first application circuit as the heating device, and the first application circuit comprises the third resistor.

5. The temperature control system of claim 3, wherein the controller is further configured to select the third left port and the third right port, such that the circuit structure is configured to form the second application circuit as the temperature sensor, and the second application circuit comprises the first to fifth resistors coupled in series.

6. The temperature control system of claim 3, wherein the controller is further configured to select the second left port and the second right port, such that the circuit structure is configured to form the first application circuit as the heating device, and the first application circuit comprises the second to fourth resistors coupled in series.

7. The temperature control system of claim 3, wherein the controller is further configured to select the second left port and the first left port, such that the circuit structure is configured to form the first application circuit as the heating device, the first application circuit comprising the second resistor, and to select the first left port and the third right port, such that the circuit structure is configured to form the second application circuit as the temperature sensor, the second application circuit comprising the third to fifth resistors coupled in series.

8. The temperature control system of claim 1, wherein the temperature control system further comprises a cooling device electrically coupled to the controller; and the controller is further configured to control the cooling device to cool the reaction zone until a temperature of the reaction zone reaches a second preset temperature.

9. The temperature control system of claim 8, wherein the cooling device comprises a reservoir and a plurality of first electrodes disposed adjacent to each other at a periphery of the reservoir;

a first electrode layer is disposed below the reaction zone and comprises a plurality of second electrodes arranged in a matrix;

the plurality of first electrodes and the plurality of second electrodes are electrically coupled to the controller; and the controller is further configured to drive, according to a first path, a droplet in the reservoir to flow from one of the plurality of first electrodes, pass through some of the plurality of second electrodes, return to the first electrode, and move into the reservoir through the first electrode.

10. A micro-fluidic detection system, comprising a micro-fluidic chip, and the temperature control system of claim 1, wherein the functional layer is disposed under the reaction zone.

11. The micro-fluidic detection system of claim 10, wherein the micro-fluidic chip further comprises a sample addition zone and a detection zone;

the sample addition zone and the detection zone are at two sides of the reaction zone, respectively;

a second electrode layer configured to drive a droplet to move is provided under the sample addition zone and the detection zone; and the second electrode layer is electrically coupled to the controller.

12. A temperature control method for a micro-fluidic chip, applied to the temperature control system of claim 1, comprising:

in a heating mode, selecting the second input port and the second output port, such that the circuit structure is configured to form the second application circuit as the temperature sensor; and selecting the first input port and the first output port, such that the circuit structure is configured to form the first application circuit as the heating device.

13. The temperature control method of claim 12, further comprising:

obtaining a current temperature of the reaction zone, in response to the circuit structure being configured to form the second application circuit as the temperature sensor; and selecting the first input port and the first output port, in a case where the current temperature is lower than a first preset temperature, such that the circuit structure is configured to form the first application circuit as the heating device to heat the reaction zone until a temperature of the reaction zone reaches the first preset temperature.

14. The temperature control method of claim 13, after the current temperature of the reaction zone is obtained, further comprising:

determining an output duty cycle of a control signal output to the circuit structure based on the current temperature and the first preset temperature, wherein the output duty cycle is configured to control a time period during which the circuit structure is configured to form the temperature sensor or the heating device.

15. The temperature control method of claim 13, further comprising:

in a cooling mode, selecting the second input port and the second output port, such that the circuit structure is configured to form the second application circuit as the temperature sensor to obtain the current temperature of the reaction zone; and controlling the cooling device to cool the reaction zone until the temperature of the reaction zone reaches the second preset temperature, in response to the current temperature being higher than a second preset temperature.

16. The temperature control method of claim 15, wherein the cooling device comprises a reservoir and a plurality of first electrodes disposed adjacent to each other at a periphery of the reservoir; a first electrode layer is disposed below the reaction zone and comprises a plurality of second electrodes arranged in a matrix; the plurality of the first electrodes and the plurality of second electrodes are electrically coupled to the controller; and wherein the controlling the cooling device to cool the reaction zone comprises driving, according to a first path, a droplet in the reservoir to flow from one of the plurality of first electrodes, pass through some of the plurality of second electrodes, return to the first electrode, and move into the reservoir through the first electrode.

17. The temperature control method of claim 12, further comprising:

determining a position of a droplet to be reacted; and staring the heating mode before the droplet to be reacted enters into the reaction zone.

18. The temperature control method of claim 15, further comprising:

determining a position of a reacted droplet; and starting the cooling mode after the reacted droplet exits the reaction zone.

* * * * *